US008209685B1

(12) United States Patent
Getlin et al.

(10) Patent No.: US 8,209,685 B1
(45) Date of Patent: Jun. 26, 2012

(54) VIRTUAL MACHINE DEVICE ACCESS

(75) Inventors: Brent Getlin, Leander, TX (US); Rupen Chanda, San Francisco, CA (US); Rob Borcic, Pittsburg, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1247 days.

(21) Appl. No.: 11/945,084

(22) Filed: Nov. 26, 2007

(51) Int. Cl.
*G06F 9/455* (2006.01)
*G06F 9/46* (2006.01)
*G06F 7/00* (2006.01)
(52) U.S. Cl. ............... 718/1; 718/100; 707/613
(58) Field of Classification Search .............. None
See application file for complete search history.

(56) References Cited

U.S. PATENT DOCUMENTS

| 4,718,008 | A | * | 1/1988 | Chang et al. ............... 711/209 |
| 5,257,386 | A | * | 10/1993 | Saito ............................ 712/225 |
| 5,327,558 | A | | 7/1994 | Burke et al. |
| 5,715,474 | A | | 2/1998 | Burke et al. |
| RE36,462 | E | * | 12/1999 | Chang et al. ............... 711/209 |
| 6,253,224 | B1 | * | 6/2001 | Brice et al. ..................... 718/1 |
| 6,289,382 | B1 | | 9/2001 | Bowman |
| 6,625,751 | B1 | * | 9/2003 | Starovic et al. ............. 714/11 |
| 6,658,573 | B1 | | 12/2003 | Bischof et al. |
| 6,802,062 | B1 | * | 10/2004 | Oyamada et al. ............. 718/1 |
| 7,333,974 | B2 | * | 2/2008 | Patterson ............................ 1/1 |
| 2003/0074487 | A1 | | 4/2003 | Akgul et al. |
| 2006/0242598 | A1 | * | 10/2006 | Marascio et al. ............ 715/810 |
| 2006/0249567 | A1 | | 11/2006 | Byrne et al. |
| 2007/0101032 | A1 | * | 5/2007 | Nara ............................ 710/113 |
| 2007/0130331 | A1 | | 6/2007 | Kao et al. |
| 2008/0189350 | A1 | * | 8/2008 | Vasa et al. ..................... 709/201 |
| 2009/0089785 | A1 | | 4/2009 | Marwinski et al. |

OTHER PUBLICATIONS

JSR 75: PIM Optional Package Specification (2004) [retrieved on Nov. 26, 2007].
Chanda, "Embedded Document within an Application", Pending U.S. Appl. No. 11/567,111, filed Dec. 5, 2006, 24 pages.
Hosmer, et al., "System and Method for Developing Information for a Wireless Information System", Pending U.S. Appl. No. 10/791,299, filed Mar. 1, 2004, 26 pages.
Morris, et al., "Mobile Rich Media Information System", Pending U.S. Appl. No. 10/791,298, filed Mar. 1, 2004, 43 pages.
Qualcomm Incorporated, "Binary Runtime Environment for Wireless", May 8, 2003, 43 pages.
Rodgers, et al. "Bandwidth Management System", Pending U.S Appl. No. 10/791,311, filed Mar. 1, 2004, 27 pages.

* cited by examiner

*Primary Examiner* — Emerson Puente
*Assistant Examiner* — Adam Lee
(74) *Attorney, Agent, or Firm* — Fish & Richardson P.C.

(57) ABSTRACT

The present disclosure includes, among other things, systems, methods and program products for virtual machine device access. A first asynchronous request from a virtual machine executing on a device is identified, where the first asynchronous request is for accessing one or more of the device's information or services. The first asynchronous request is retrieved from the virtual machine. The first asynchronous request is scheduled to be provided as a second request to a service provider on the device, where the service provider is operable to handle the second request. The second request is provided to the service provider and a first response is received from the service provider to be provided to the virtual machine as a second response. First code is selected in the virtual machine from a plurality of code to receive the second response and providing the second response to the selected code.

21 Claims, 7 Drawing Sheets

```
// ---------------------------------------------------------------
// Program Description:
// Display the 5 most recent entries in the system call log.
// Update the list whenever the CallLog is changed.
// ---------------------------------------------------------------

// Define a function to update the display with the changed entries
function updateEntries(status:Number, entries:Array)
{
    if (status > 0)
    {
        // Iterate through the entries array
    }
}

// Define a function to handle changes to the system calllog
function callLogChanged(status:Number)
{
    if (status > 0)
    {
        // Collect the first five entries at the top of the list
        callLogView.getFirst(this, "updateEntries", 5);
    }
}

// Create an instance of the CallLog API
var callLog:Object = new CallLog();

// Define the filter
var filter:Object = new Object();
filter.type = 0xF;

// Define the format
var format:Object = new Object();
format.returnFields = 0xFF;

// Define a filtered list of CallLog entries
var callLogView = callLog.createDataView(filter, format, 5);

// Start listening for changes to the system call log
callLogView.listenForChanges(this, "callLogChanged");

// Start processing by getting the first five entries
callLogView.getFirst(this, "updateEntries", 5);
```

FIG. 4A

VIRTUAL MACHINE DEVICE ACCESS

BACKGROUND

Mobile phone operating systems provide access to phone services such as the ability to place and receive telephone calls, send and receive text messages, and browse web pages. In addition, such operating systems typically manage personal information used by the services such as telephone numbers, recently dialed telephone numbers, email addresses, and the like. Software programs can be written to access this information and the services through application programming interfaces provided by the operating systems, however, such programs are characteristically not directly portable from one operating system to another. Moreover, such programming interfaces are commonly synchronous, meaning that programs that utilize them are required to block until an operating system function call returns.

SUMMARY

In general, one or more aspects of the subject matter described in this specification can be embodied in one or more methods that include identifying a first asynchronous request from a virtual machine executing on a device where the first request is for accessing one or more of the device's information or services. The first request is retrieved from the virtual machine. The first request is scheduled to be provided as a second request to a service provider on the device, where the service provider is operable to handle the second request. The second request is provided to the service provider and a first response is received from the service provider to be provided to the virtual machine as a second response. First code is selected in the virtual machine from a plurality of code to receive the second response and providing the second response to the selected code. Other embodiments of this aspect include corresponding systems, apparatus, and computer program products.

These and other embodiments can optionally include one or more of the following features. Selecting first code can include identifying the first code based on information contained in the first request. Providing the second response to the first code can include invoking the first code. Scheduling can include maintaining a list of pending requests and adding the first request to the list. Providing the second request to the service provider can include determining if there are no pending requests that were retrieved before the second request. Providing the second request to the service provider can include determining whether the service provider is able to accept the second request. The second request can be asynchronous.

Particular implementations of the subject matter described in this specification can be implemented to realize one or more of the following advantages. Programs written to access mobile device services and information are portable across mobile device operating systems. Access to mobile device information and services is asynchronous—allowing programs to continue their execution during fulfillment of their requests—or synchronous.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

FIG. 4A illustrates example code for displaying recent calls on a device.

Like reference numbers and designations in the various drawings indicate like elements.

DETAILED DESCRIPTION

Figure 1:
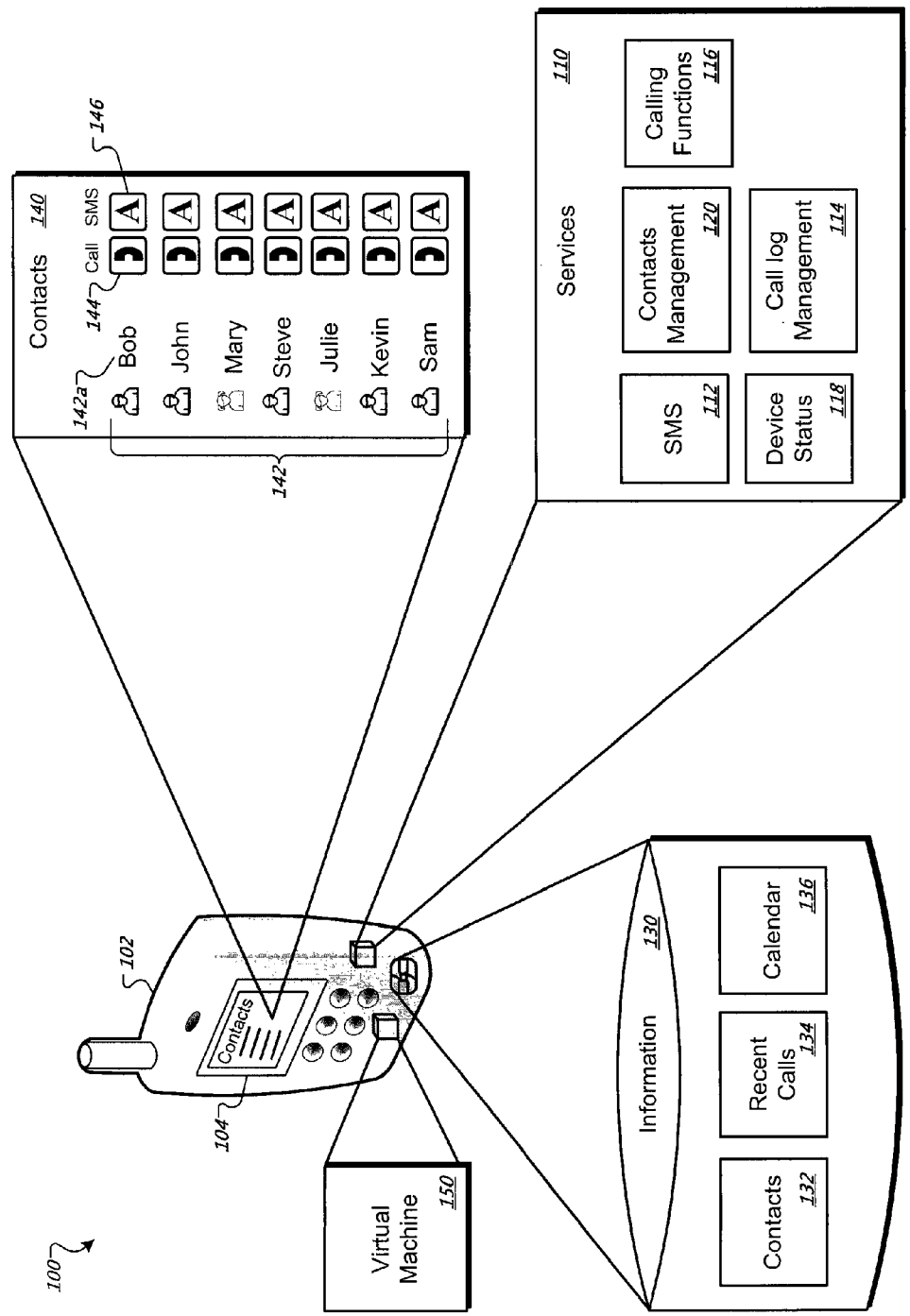
FIG. 1 illustrates an example system for accessing data and services on a device.

FIG. 1 illustrates an example system 100 for accessing data and services on a device 102. In various implementations, the device 102 is a mobile phone, smart phone, personal digital assistant (PDA), Blackberry device, laptop computer, Pocket PC, electronic gaming device, media player, personal computer, workstation, server or combinations of these. Other types of devices are possible. The device 102 includes a display 104, which can be touch sensitive, and which can be integrated with the device 102 or separate from the device 102. The device 102 can also include, for example, one or more wireless network transceivers (e.g., Wi-Fi, Bluetooth), integrated or separate speakers for outputting sound, user input devices such as buttons, a keypad, a mouse or joystick, a microphone, and an accelerometer for determining the orientation of the device 102.

The device 102 can provide one or more services 110 that include, for example, SMS (Short Message Service) services 112, call log management services 114, calling functions services 116, device status services 118, and contacts management services 120. The device 102 includes a data store 130 for personal information and other information needed by the services. The data store 130 can be, for example, a SIM (Subscriber Identity Module) card, flash memory, or some other kind of storage. The data store 130 can include, for example, contacts information 132, recent call information 134, and calendar information 136.

The SMS services 112 can include, for example, services for sending and receiving messages and viewing previously received messages. The call log management services 114 can include, for example, services for viewing and filtering call log entries. Call log entries, which can be included in the recent calls information 134, can include, for example, information for dialed calls, accepted calls, missed calls and rejected calls. The calling functions services 116 can include, for example, services for placing calls, receiving calls, showing caller identity, and rejecting calls. The device status services 118 can include services for querying or setting system information. For example, the device status services 118 can include services for querying signal strength, geographic location, battery strength, charging status, SIM availability, operator name, cellular service provider name, roaming status, power mode, and default ring tone. The device status services 118 can also include, for example, services for setting a low battery threshold, backlight mode, power mode, and default ring tone. The contacts management services 120 can include, for example, services for interacting with the contact information 132, such as viewing contacts, adding and removing contacts, and searching for contacts.

The display 104 presents a GUI (Graphical User Interface) 140. The GUI 140 can display, for example, information from the contacts information 132. For example, a contact list 142 displays contact names and associated pictures. The GUI 140 can allow for a user to request services included in the services 110. For example, a button 144 allows a user to place a call to a contact 142a named "Bob". As another example, a button 146 allows a user to send a text message (e.g., SMS message) to the contact 142a. The GUI 104 can display other information, such as the recent calls information 134, or a calendar displaying calendar information 136.

The device 102 includes a virtual machine 150. The virtual machine 150 can be the Adobe® Flash® Player available from Adobe Systems Incorporated (e.g., a virtual machine capable of executing ActionScript™), a Java Virtual Machine, the Common Language Runtime (available from Microsoft Corporation), or some other virtual machine. The virtual machine 150 runs on the device 102 and allows for programs to run on the virtual machine 150 which can create a rich user interface (e.g., the GUI 140) which allows access to device data (e.g., contacts information 132, recent calls information 134, calendar information 136) and device services (e.g., SMS services 112, call log management services 114, calling functions services 116, device status services 118, contacts management services 120). The virtual machine 150 provides an API (Application Programming Interface) which enables programs to access data and services on the device 102. The virtual machine 150 coordinates the loading and running of programs that run on the device 102, as well as coordinating access to device data and services.

Figure 2:
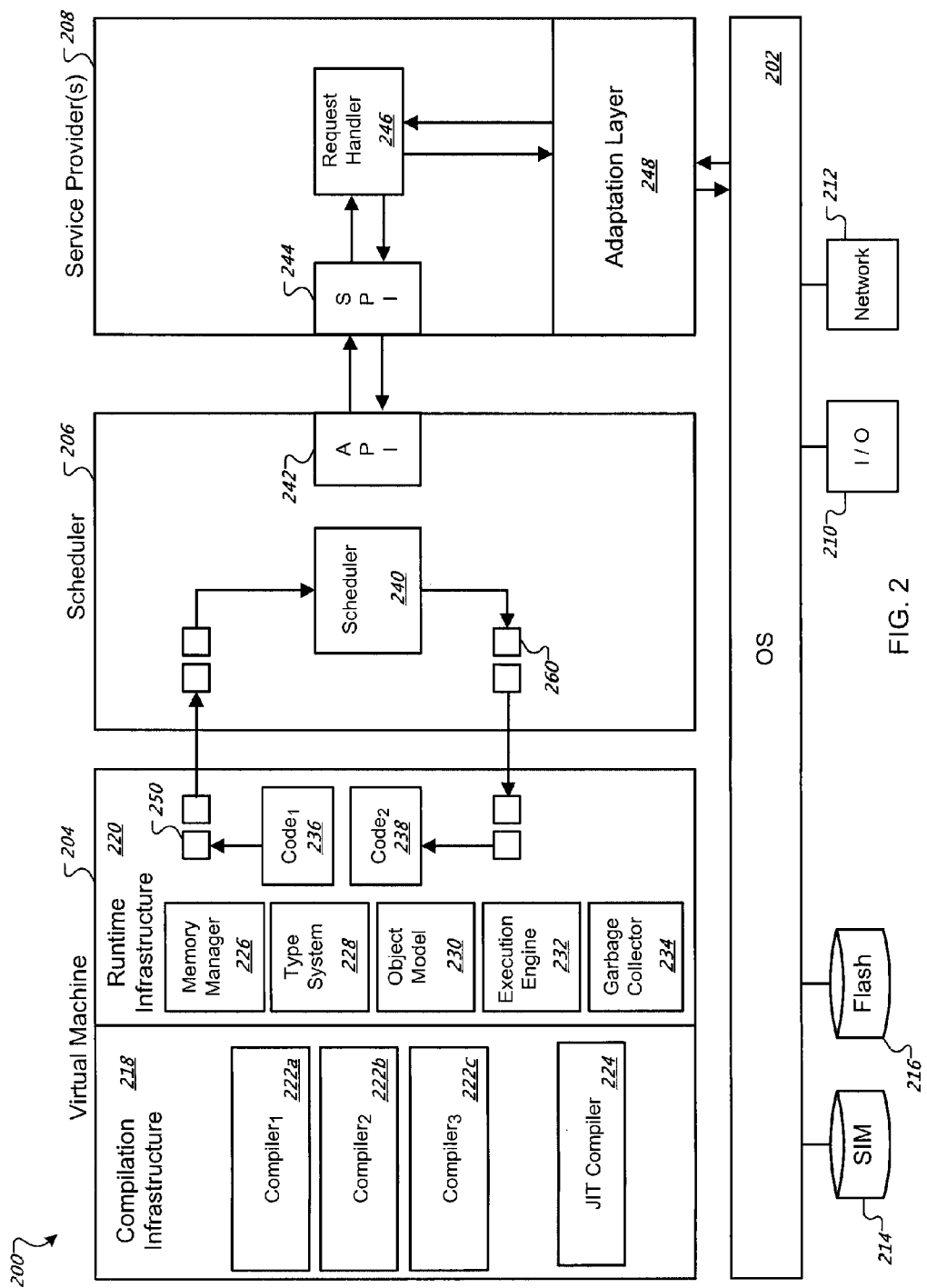
FIG. 2 illustrates an example system for providing access to a device's information and services.

FIG. 2 illustrates an example system 200 for providing access to a device's information and services. The system 200 includes an operating system 202 that runs on a device (e.g., device 102). The operating system 202 can be the Symbian operating system (available from Symbian Software Limited, Redwood Shores, Calif.) or the BREW (Binary Runtime Environment for Wireless) operating system (available from Qualcomm Incorporated, San Diego, Calif.), for example. Other operating systems are possible, however. The operating system 202 manages hardware and software resources of the device 102. For example, the operating system 202 manages input/output devices 210 (e.g., display 104, a keypad, buttons, a mouse, and a joystick), network connections 212 to one or more wired or wireless networks, and persistent storage such as a SIM card 214 and/or flash memory 216. The SIM card 214 and/or the flash memory 216 can be used, for example, to store the information 130. That is, the SIM card 214 and/or the flash memory 216 can be used to store contacts information 132, recent calls information 134, and calendar information 136, for instance.

A virtual machine 204, a scheduler 206 and one or more service providers 208 run on the operating system 202. The virtual machine 204 can be an ActionScript virtual machine, a Java virtual machine, or the Common Language Runtime, to name a few examples. Other virtual machines are possible. The virtual machine 204 includes a compilation infrastructure 218 and a runtime infrastructure 220. The compilation infrastructure 218 includes one or more compilers 222a-c and a JIT (Just In Time) compiler 224. The virtual machine 204 can compile programs in one or more source languages into the an intermediate language. For example, the compiler 222a can compile Java source code into an intermediate bytecode, the compiler 222b can compile ActionScript into the same intermediate bytecode, and the compiler 222c can compile C++ source code into the same intermediate bytecode. The JIT compiler 224 can compile (e.g., before runtime) the bytecode generated by the compilers 222a-c into machine executable code. By way of illustration, compiler 222a and JIT compiler 224 can be used to compile user programs 236 and 238.

The runtime infrastructure 220 includes a memory manager 226, a type system 228, an object model 230, an execution engine 232, a garbage collector 234, and a JIT compiler 239. The memory manager 226 manages memory allocation and deallocation (e.g., in heap memory and other data areas). The type system 228 can, for example, keep track of object types in code that has been loaded in the virtual machine 204 and is used by the compilation infrastructure 218 and by the execution engine 232. The execution engine 232 loads and executes programs (e.g., 236, 238) in the virtual machine 204. The garbage collector 234 identifies memory (e.g., object instance data) that is no longer being referenced so that memory can be freed and made available for use by programs.

By way of illustration, a program or code 236 can be, for example, executable code associated with a function, a method, or a script. The first code 236 invokes a method or a function to request information or services (e.g., to request recent call information). In response, a request message 250 is created and provided to a scheduler 206. The scheduler 206 includes a scheduler subcomponent 240 and an API 242. Each service provider 208 includes an SPI (Service Provider Interface) 244, a request handler 246, and an adaptation layer 248. The first code 236 continues executing and is not blocked awaiting the processing of the request message 250. The request message 250 can be queued, or it can be sent to the scheduler subcomponent 240 through some other method of interprocess communication. In some implementations, the scheduler 206 and the virtual machine 204 may run within the same process (e.g., as separate threads within a process). If the scheduler 206 and the virtual machine 204 run in the same process, the message 250 can be communicated, for example, through the use of a common data area.

The scheduler subcomponent 240 receives the request message 250. The scheduler subcomponent 240 manages incoming requests, such as keeping track of the order of requests and keeping track of which requests have been serviced and which are waiting for service. Messages awaiting servicing can be stored in a table, list, or some other data structure, for example. The scheduling subcomponent 240 can determine when a service provider 208 is able to handle requests. To processes the request message 250, a corresponding API call is invoked in the API 242. The API 242 can communicate with the service provider 208 through the service provider interface 244. The service provider 208 interacts with the operating system 202 to access device information and services. The service provider 208 may run in a process separate from the scheduler 206, or may run in the same process as the scheduler 206 (and, in some implementations, in the same process as the virtual machine 204). The service provider 208 can, for example, be implemented in a dynamic link library (DLL) which linked to the scheduler 206.

The call from the API 242 to the SPI 244 can be asynchronous or synchronous. For example, if the scheduler 206 and the service provider 208 run in the same process, the call from the API 242 to the SPI 244 can be implemented, for example, as a function or method call. If, for example, the scheduler 206 and the service provider 208 run in different processes, the call from the API 242 to the SPI 244 can be implemented using asynchronous message processing. In various implementations, the SPI 244 defines a set of programmatic interfaces which can be used to access device services or information. The API 242 can map the request message 250 to one or more invocations of the SPI 244 (e.g., in some implementations, a single request message 250 from the virtual machine 204 can result in multiple calls to the SPI 244).

Calls to the SPI 244 can be forwarded to the request handler 246. The request handler interfaces with the adaptation layer 248. The adaptation layer 248 includes code which is aware of the specifics of the operating system 202. For example, the adaptation layer 248 is aware if the operating system 202 is BREW or Symbian. To support a new operating system (e.g., to support a transition from the BREW operating system to the Symbian operating system), code changes within the system 200 can be isolated to the adaptation layer 248.

The adaptation layer 248 invokes one or more operating system calls to access the requested service (e.g., place a call) or information (e.g., call log information). The adaptation layer 248 can receive results (e.g., requested data or indication of service success or failure) from the operating system 202. Results can be sent to the scheduler subcomponent 240, either synchronously or asynchronously. The scheduler subcomponent 240 can prepare a response message 260 to be sent to the virtual machine 204. Upon receipt of the response message 260, the virtual machine 204 can invoke the second code 238 to process the response message 260. For example, the second code 238 can present requested information such as a recent call list on the display 104 (FIG. 1).

Figure 3:
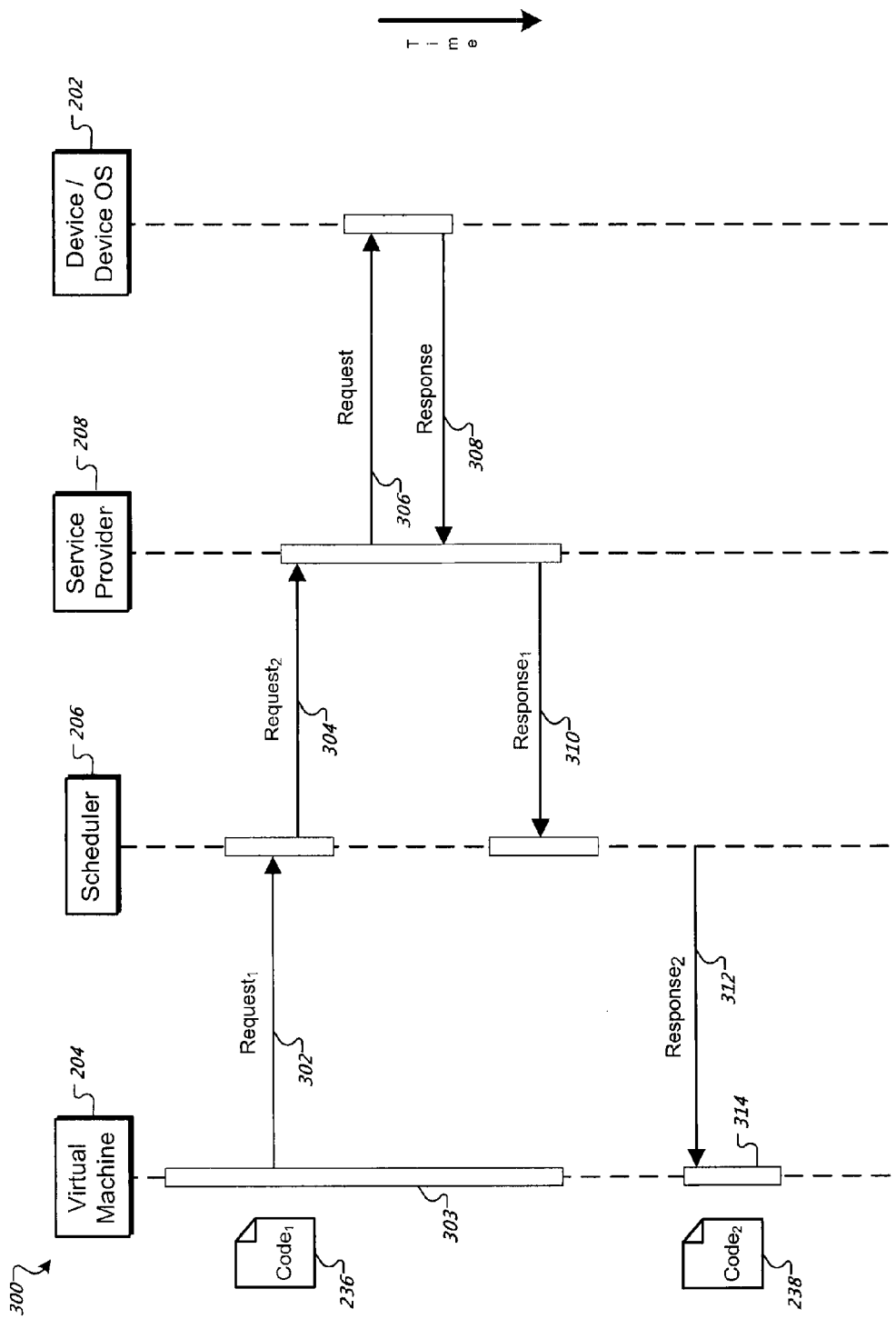
FIG. 3 illustrates an example timeline for request processing.

FIG. 3 illustrates an example timeline 300 for request processing. The timeline 300 illustrates communication between the virtual machine 204, the scheduler 206, the service provider 208 and the operating system 202 (in some implementations, there may also be communication with the device itself as well as with the operating system 202). Time progresses from the top of the page to the bottom. That is, messages displayed nearer to the top of the page occur before messages appearing nearer to the bottom of the page.

A request 302 for device information or services is sent from the virtual machine 204 to the scheduler 206. For example, code running in the first code 236 can issue a request (e.g., by invoking an API) to access device services or information, such as to send a text message. The message 302 can correspond to the message 250 (see FIG. 2). After submitting the request 302, the first code 236 continues processing, as indicated by the vertical bar 303. When the service provider 208 is able to process requests, the scheduler 206 forwards the request 302 to the service provider 208 as a request message 304. For example, the API 242 can invoke the SPI 244 (see FIG. 2).

The service provider 208 issues a request 306 to the operating system 202 (e.g., by the adaptation layer 248 invoking an operating system call). The operating system 202 sends a response 308 to the service provider 208. The service provider 208 forwards the response 308 to the scheduler 206 as a response 310.

The scheduler 206 forwards the response 310 to the virtual machine 204 as the response 312. The response 312 can, for example, correspond to the response message 260 (FIG. 2). In some implementations, the scheduler 206 can identify a callback function or method (e.g., second code 238) in the virtual machine 204 to process the response 312. For example, the request 302 can include the identity of a callback function (e.g., the identity of second code 238), and the scheduler 206 can include match the request 302 to the response 310, look up the callback function identity, and include the callback function identity in the response 312, informing the virtual machine 204 as to which code to run to process the response 312.

In other implementations, the virtual machine 204 can identify a callback function or method to process the response 312. For example, the virtual machine 204 can invoke specific callback routines to handle certain types of response messages. The first code 236 can include a response type identifier in the request 302 and the scheduler 302 can include the request type in the response 312. As indicated by vertical bar 314, the second code 238 processes the response 312, such as processing received device information or verifying that a requested service completed successfully.

FIG. 4A illustrates example code 400 for displaying recent calls on a device. The code 400 displays recent entries in the system call log whenever the call log is changed. The code 400 includes code sections 402 and 404. The code section 402 corresponds to the first code 236. That is, the code section 402 includes code that initiates a request for device information. The code section 404 corresponds to the second code 238. That is, the code section 404 includes callback functions used to process the response for the requested information.

A statement 406 creates an object which represents the call log of the device and a statement 408 creates a view object which can be used to hold call log entries. The code section 402 includes two statements 410 and 412 which are device requests. The statement 410 is a request to be notified whenever the call log changes. The statement 412 is a request to retrieve the first five entries in the call log.

The statements 410 and 412 are asynchronous requests. The code section 402 is not blocked waiting for the statements 410 and 412 to complete. For example, although the statement 412 is executed after the statement 410, the statement 412 may be executed before the request associated with the statement 410 is serviced.

The statements 410 and 412 each include the identity of a callback function which will be invoked when the associated request has been serviced. The code statement 412 includes the identity of an "updateEntries" callback function. The "updateEntries" callback function includes the statements in the code section 414. The "updateEntries" function is called when the servicing of the request represented by the statement 412 is completed. That is, the "updateEntries" function is called when the five most recent entries have been retrieved from the device's call log.

The statement 412 includes a "getFirst" method call 416 invoked on a call log view object 418 (the call log view object 418 is created when the statement 408 is executed). The "updateEntries" function defined in the code section 414 has an interface that is compatible with the "getFirst" method call 416. The "getFirst" method call expects, as one of its parameters, the identity of a callback function, where the callback function interface is to expect an array parameter which will hold the requested call log entries. The definition of the "updateEntries" function (e.g., the code section 414) includes the specification of an array parameter 420 which is compatible with the "getFirst" method call 416.

The statement 410 includes the identity of a "callLogChanged" function. The "callLogChanged" function is defined in the code section 422. The "callLogChanged" function is invoked when the servicing of the request associated with the statement 410 is completed. The "listenForChanges" call in the statement 410 is an example of an event, or notification request. The "callLogChanged" callback function defined in the code section 422 will be called when and if the associated event occurs. That is, the code in the code section 422 will be invoked if the user of the device places or receives a call (resulting in the device adding an entry to the call log). If the user never places or receives a call, the code in the code section 422 might not be invoked (the code in the code section 422 might be explicitly called from some other code, however). An event request can be repeatedly serviced. That is, the code in the code section 422 can be repeatedly called each time the call log changes.

The "callLogChanged" function includes a statement 424 which is identical to the statement 412. The effect of the statement 424 is that when the call log changes (e.g., when the "callLogChanged" function is called), another asynchronous request is made, requesting the most recent five entries in the call log. When the most recent five entries in the call log have been retrieved, the callback function specified in the statement 424 is invoked. That is, the "updateEntries" function is invoked, and the array parameter 420 is populated with the five most recent call log entries. The "updateEntries" function can process the array, such as displaying the most recent call log entries on the display 104 (FIG. 1).

Figure 4B:
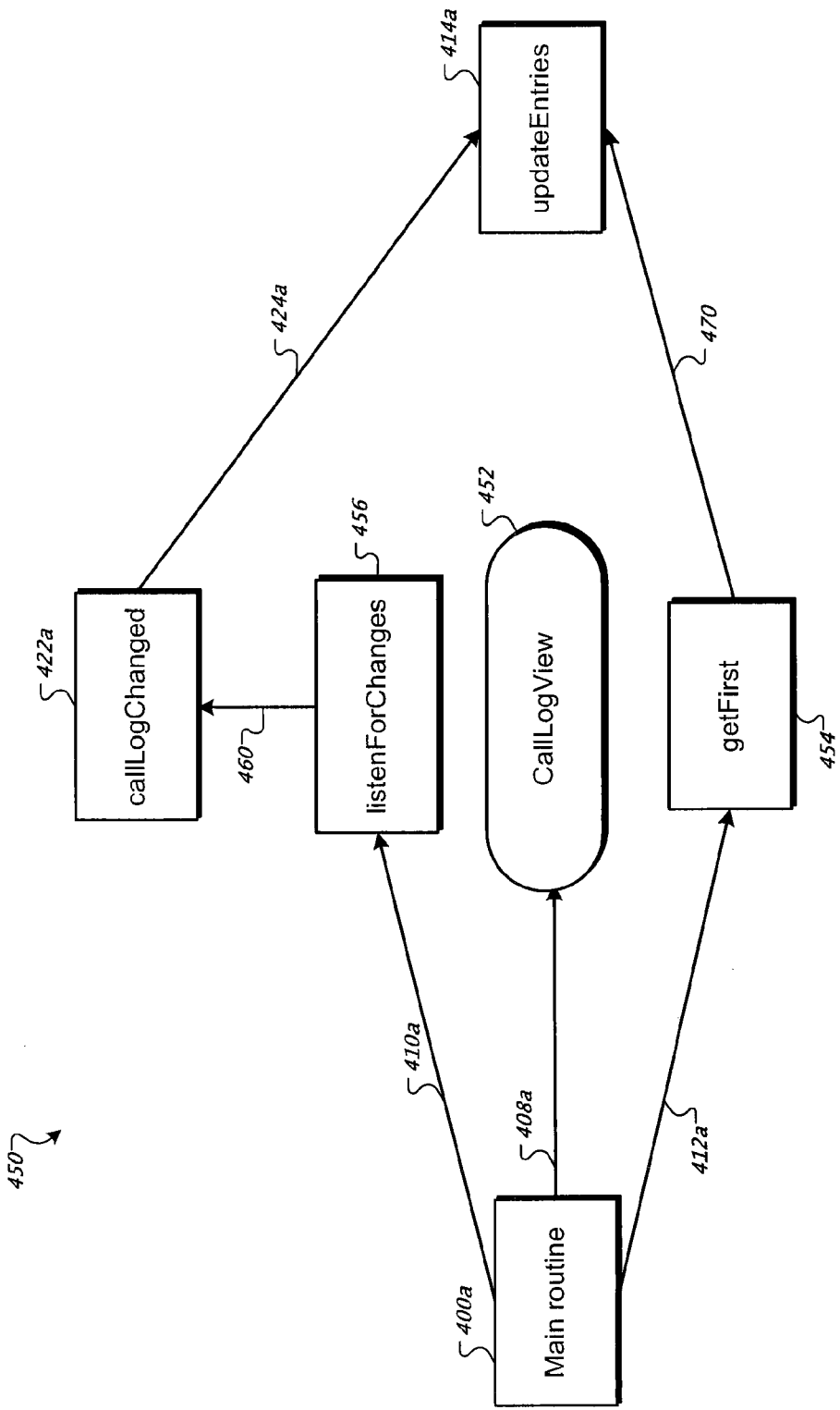
FIG. 4B is an example call diagram which illustrates function and method calls during the processing of a request.

FIG. 4B is an example call diagram 450 which illustrates function and method calls during the processing of a request. The diagram 450 includes symbols representing code entities found in the code 400 of FIG. 4. A main routine symbol 400a represents the code 400. A "callLogChanged" symbol 422a represents the "callLogChanged" function defined in the code section 422. An "updateEntries" symbol 414a represents the "updateEntries" function defined in the code section 414. A "CallLogView" symbol 452 represents the call log view object created in statement 408. A "getFirst" symbol 454 and a "listenForChanges" symbol 456 represent the "getFirst" and "listenForChanges" methods of the call log view object, respectively.

An arrow 408a represents the creation of a call log view object by the main routine 400 in statement 408. An arrow 410a represents the "listenForChanges" method call included in the statement 410. An arrow 412a represents the "getFirst" method call included in the statement 412.

An arrow 470 represents the call of the "updateEntries" method which occurs after the servicing of the "getFirst" request issued with the execution of the statement 412. An arrow 460 represents the call of the "callLogChanged" function which occurs after (and if) the call log of the device changes. As noted earlier, the "callLogChanged" function is invoked to handle the notification that the call log has changed. An arrow 424a represents the call of the "updateEntries" function in statement 424 by the "callLogChanged" function.

Figure 5:
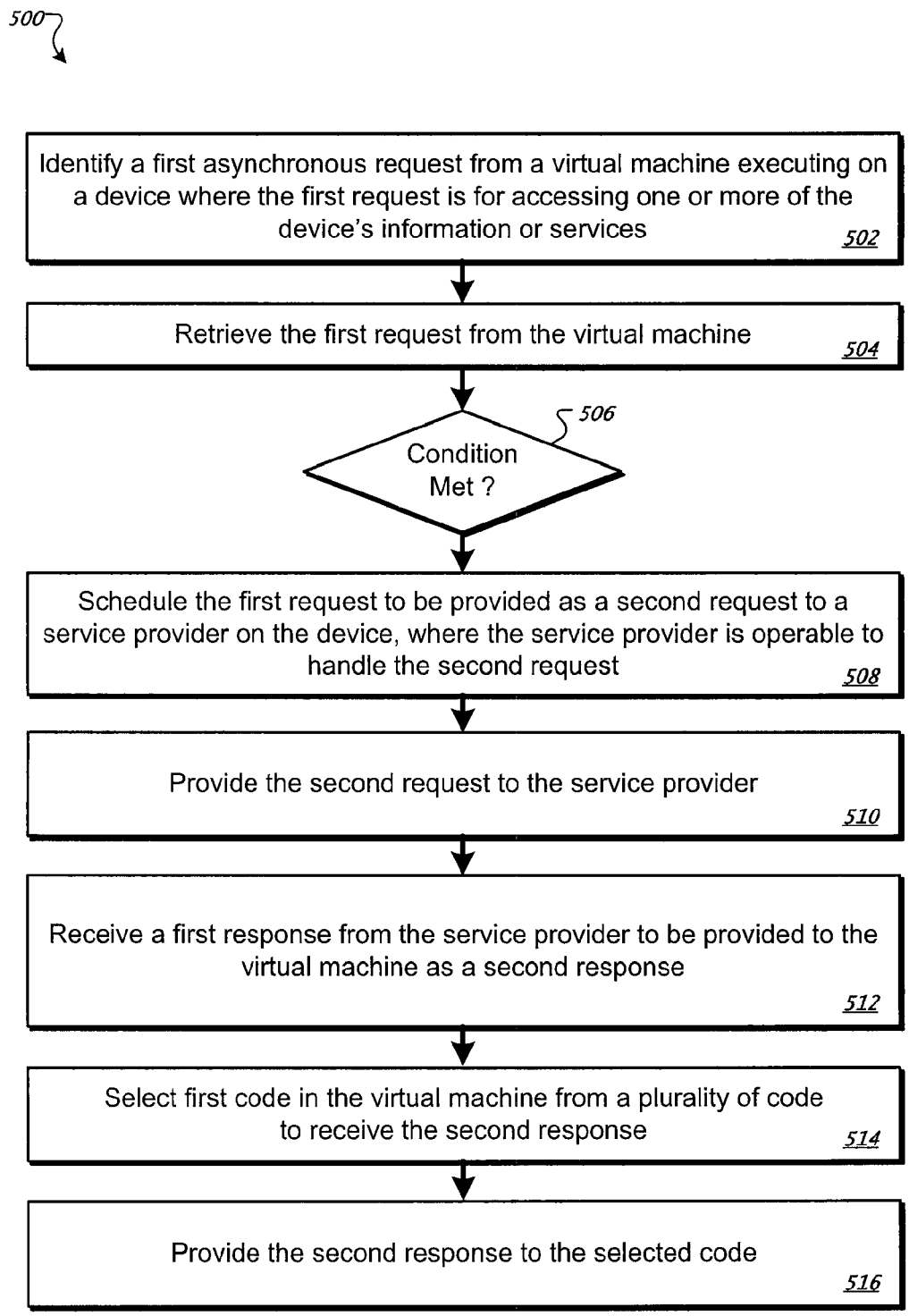
FIG. 5 illustrates an example technique for accessing a device's information and services.

FIG. 5 illustrates an example technique 500 for accessing a device's information and services. First, a first asynchronous request from a virtual machine executing on a device is identified, where the first request is for accessing one or more of the device's information or services (step 502). For example, the scheduler 206 can identify the request message 250 sent from the virtual machine 204 (FIG. 2). The first request is then retrieved from the virtual machine (step 504). For example, the request message 250 can be retrieved by the scheduler 250 from a data structure, from a queue, or from shared memory, to name a few examples.

Next, it is determined whether a condition is met (step 506). For example, the scheduler 206 can determine whether the service provider 208 is able to process requests. The first request is then scheduled, and is provided as a second request to a service provider on the device, where the service provider is operable to handle the second request (step 508). For example, the request 250 (represented by the request 302 in FIG. 3) can be forwarded to the service provider 208 as the request 304 (FIG. 3). The second request is then provided to the service provider (step 510). For example, the service provider 208 can receive the request 304.

A first response is then received from the service provider and is provided to the virtual machine as a second response (step 512). For example, the response 260 (FIG. 2) can be provided to the virtual machine 204. As another example, the response 310 (FIG. 3) can be received by the scheduler 206 from the service provider 208 and forwarded to the virtual machine as the response 312.

Next, first code is selected in the virtual machine from a plurality of code to receive the second response (step 514). For example, the code 238 can be selected to receive the response 312. The second response is then provided to the selected code (step 516). For example, the response 312 can be provided to the code 238. The code 238 can be invoked, and the response 312 can be processed.

Figure 6:
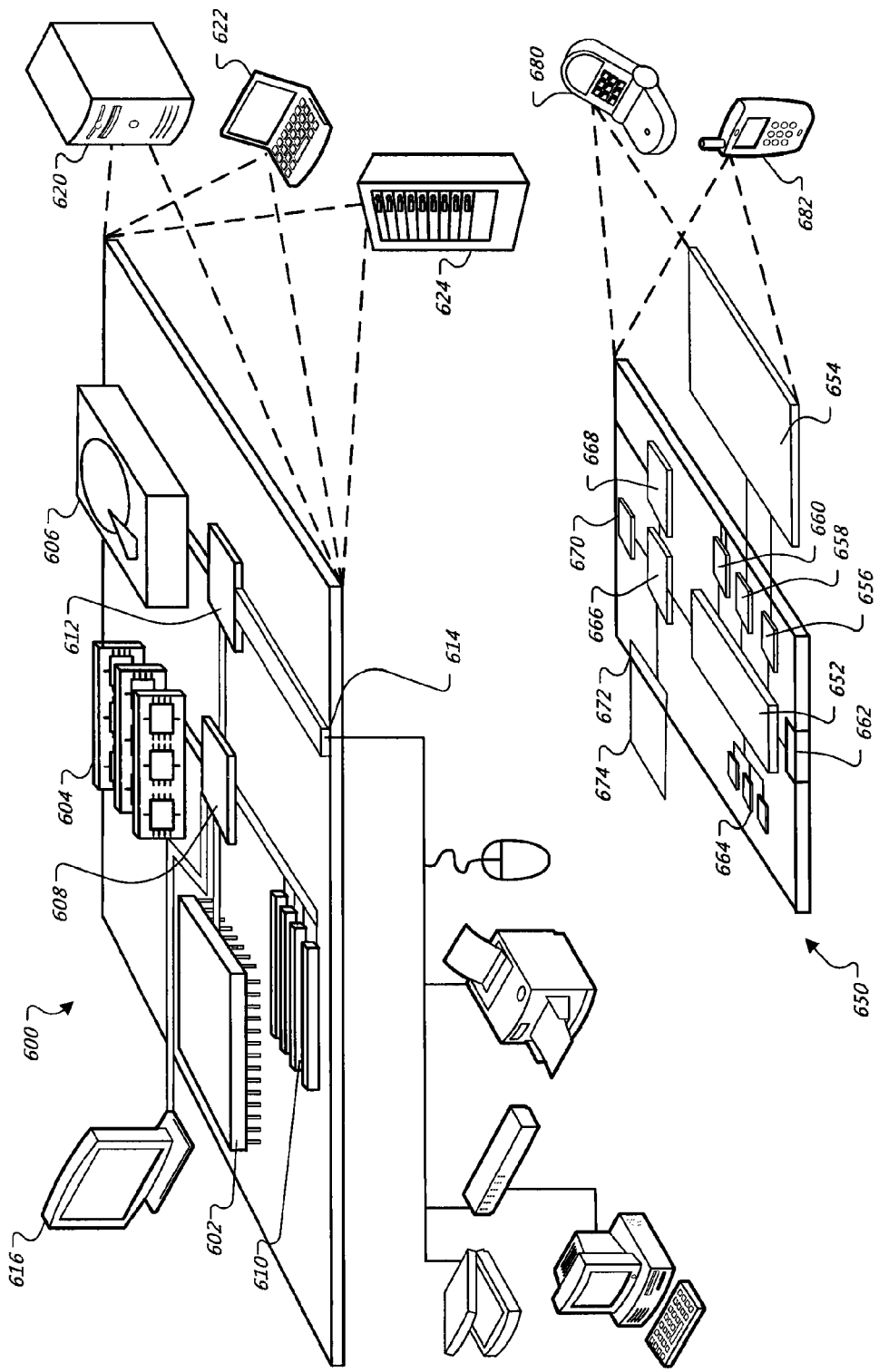
FIG. 6 is a block diagram of generic computing devices.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units. The memory can hold instructions for implementing the systems and techniques described above.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. The storage device 606 can, for example, store the device information 130.

In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other implementations are within the scope of the following claims.

What is claimed is:

1. A computer-implemented method comprising:
    running, on an operating system of a device, a virtual machine, a scheduler and a service provider;
    identifying, by the scheduler, a first asynchronous request from the virtual machine, where the first asynchronous request is for accessing one or more of the device's information or services;
    retrieving, by the scheduler, the first asynchronous request from the virtual machine;
    scheduling, by the scheduler, the first asynchronous request to be provided as a second request to the service provider on the device, where the service provider is operable to handle the second request;
    providing, by the scheduler, the second request to the service provider;
    invoking, by the service provider, an operating system call to the operating system of the device based on the second request;
    receiving, by the service provider, an operating system response;
    receiving, by the scheduler, a first response from the service provider;
    providing, by the scheduler and to the virtual machine a second response;
    selecting, by the virtual machine, first code in the virtual machine from a plurality of code to receive the second response and providing the second response to the selected code.

2. The method of claim 1, where selecting first code includes:
    identifying the first code based on information contained in the first asynchronous request.

3. The method of claim 1 where providing the second response to the first code includes invoking the first code.

4. The method of claim 1 where scheduling includes:
    maintaining a list of pending requests; and
    adding the first asynchronous request to the list.

5. The method of claim 4 where providing the second request to the service provider includes determining if there are no pending requests that were retrieved before the second request.

6. The method of claim 1 where providing the second request to the service provider includes determining whether the service provider is able to accept the second request.

7. The method of claim 1 where the second request is asynchronous.

8. A computer program product, encoded on a non-transitory computer-readable medium, operable to cause one or more computing devices to perform operations comprising:
    running, on an operating system of a device, a virtual machine, a scheduler and a service provider;
    identifying, by the scheduler, a first asynchronous request from the virtual machine, where the first asynchronous request is for accessing one or more of the device's information or services;
    retrieving, by the scheduler, the first asynchronous request from the virtual machine;
    scheduling, by the scheduler, the first asynchronous request to be provided as a second request to the service provider on the device, where the service provider is operable to handle the second request;
    providing, by the scheduler, the second request to the service provider;
    invoking, by the service provider, an operating system call to the operating system of the device based on the second request;
    receiving, by the service provider, an operating system response;
    receiving, by the scheduler, a first response from the service provider;
    providing, by the scheduler and to the virtual machine a second response;
    selecting, by the virtual machine, first code in the virtual machine from a plurality of code to receive the second response and providing the second response to the selected code.

9. The computer program product of claim 8, where selecting first code includes:
    identifying the first code based on information contained in the first asynchronous request.

10. The computer program product of claim 8 where providing the second response to the first code includes invoking the first code.

11. The computer program product of claim 8 where scheduling includes:
   maintaining a list of pending requests; and
   adding the first asynchronous request to the list.

12. The computer program product of claim 11 where providing the second request to the service provider includes determining if there are no pending requests that were retrieved before the second request.

13. The computer program product of claim 8 where providing the second request to the service provider includes determining whether the service provider is able to accept the second request.

14. The computer program product of claim 8 where the second request is asynchronous.

15. A system comprising:
   one or more computing devices; and a computer-readable medium that encodes a system operable to cause the one or more computing devices to perform operations comprising:
   running, on an operating system of a device, a virtual machine, a scheduler and a service provider;
   identifying, by the scheduler, a first asynchronous request from the virtual machine, where the first asynchronous request is for accessing one or more of the device's information or services;
   retrieving, by the scheduler, the first asynchronous request from the virtual machine;
   scheduling, by the scheduler, the first asynchronous request to be provided as a second request to the service provider on the device, where the service provider is operable to handle the second request;
   providing, by the scheduler, the second request to the service provider;
   invoking, by the service provider, an operating system call to the operating system of the device based on the second request;
   receiving, by the service provider, an operating system response;
   receiving, by the scheduler, a first response from the service provider;
   providing, by the scheduler and to the virtual machine a second response;
   selecting, by the virtual machine, first code in the virtual machine from a plurality of code to receive the second response and providing the second response to the selected code.

16. The system of claim 15, where selecting first code includes:
   identifying the first code based on information contained in the first asynchronous request.

17. The system of claim 15 where providing the second response to the first code includes invoking the first code.

18. The system of claim 15 where scheduling includes:
   maintaining a list of pending requests; and
   adding the first asynchronous request to the list.

19. The system of claim 18 where providing the second request to the service provider includes determining if there are no pending requests that were retrieved before the second request.

20. The system of claim 15 where providing the second request to the service provider includes determining whether the service provider is able to accept the second request.

21. The system of claim 15 where the second request is asynchronous.

\* \* \* \* \*

UNITED STATES PATENT AND TRADEMARK OFFICE
CERTIFICATE OF CORRECTION

| | |
|---|---|
| PATENT NO. | : 8,209,685 B1 |
| APPLICATION NO. | : 11/945084 |
| DATED | : June 26, 2012 |
| INVENTOR(S) | : Brent Getlin, Rupen Chanda and Rob Borcic |

It is certified that error appears in the above-identified patent and that said Letters Patent is hereby corrected as shown below:

Column 13, Line 23 (Claim 15), delete "a" and insert -- the computing --, therefor.

Signed and Sealed this
Twenty-first Day of August, 2012

David J. Kappos
*Director of the United States Patent and Trademark Office*